Dec. 26, 1933.  C. A. OTTO  1,941,314
TEMPERATURE CONTROL
Filed April 3, 1933
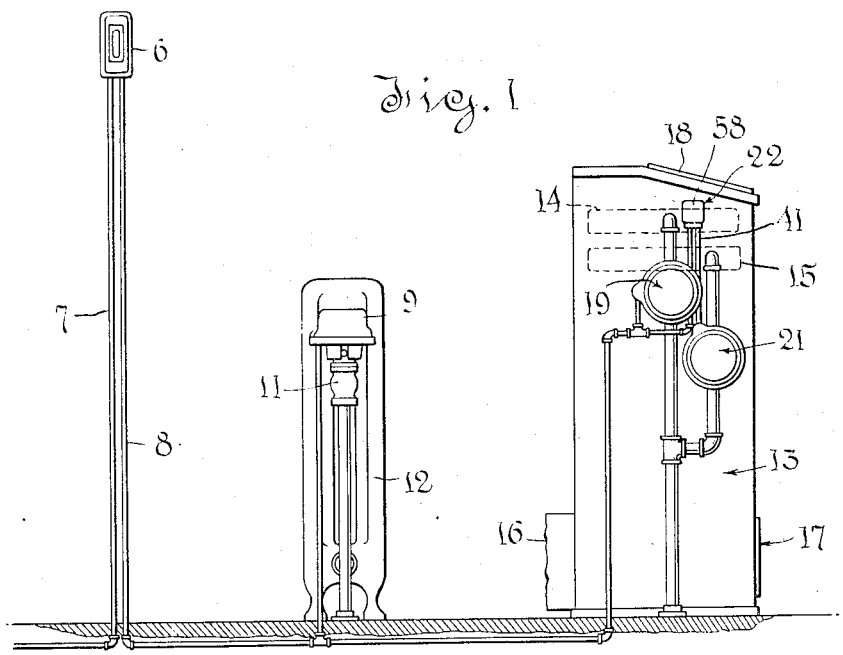
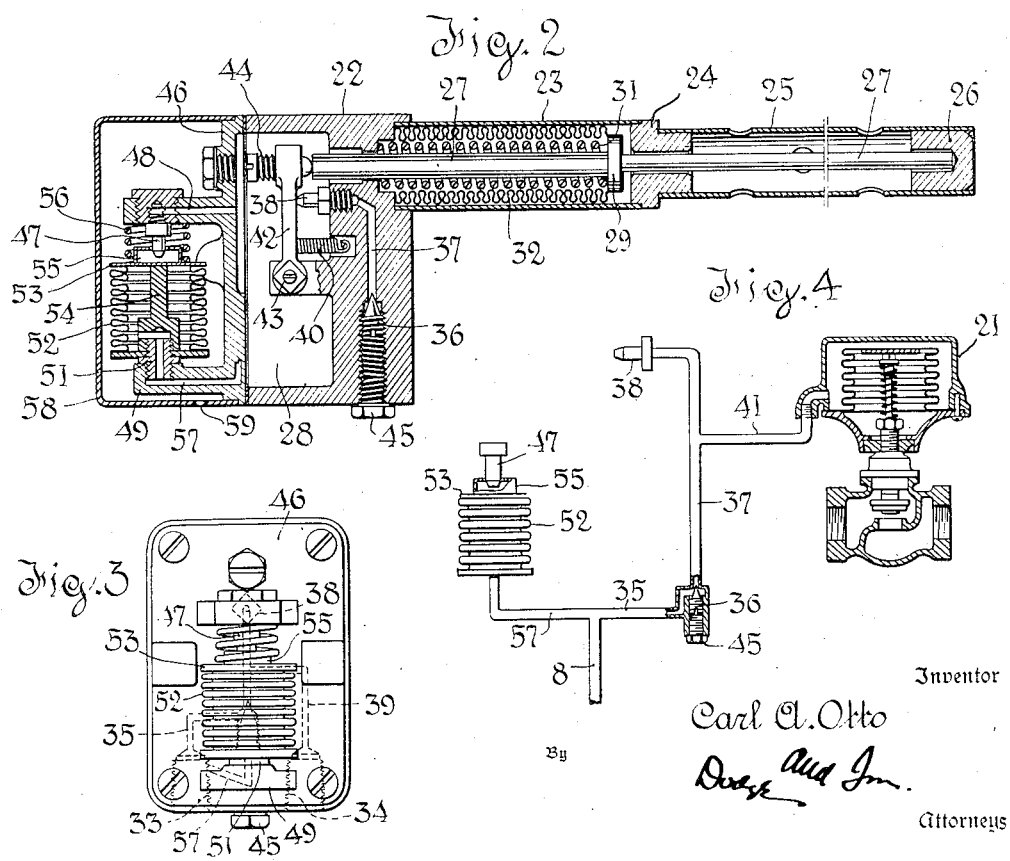
Inventor
Carl A. Otto
By
Attorneys Patented Dec. 26, 1933

1,941,314

UNITED STATES PATENT OFFICE 1,941,314

TEMPERATURE CONTROL

Carl A. Otto, Milwaukee, Wis., assignor to Johnson Service Company, Milwaukee, Wis., a corporation of Wisconsin Application April 3, 1933. Serial No. 664,272

13 Claims. (Cl. 236—37)

This invention relates to temperature regulation, and particularly to the control of a heat source by two thermostatic means, one of which responds to the temperature of the space heated by said source, and the other of which imposes a limitation on the output of heat by the heat source.

In the control of heating systems, it has heretofore been proposed to make use of a room thermostat which exercised a primary control on the heater, and a limiting thermostat which was subject to temperature adjacent the heater and which exercised a limiting control on the heater. A familiar example is the use of a room thermostat to exercise primary control on a heating unit, such as a radiator placed in a duct, and a limiting thermostat subject to the temperature of air passing through the duct, the function of the limiting thermostat being commonly to insure that the air discharged in the room shall never fall below a certain temperature.

Such duct systems ordinarily receive their air from out of doors, or partly from out of doors and partly from the room heated. Under mild weather conditions, if the room reaches the maximum temperature the room thermostat will shut off the heat. The cold outside air entering without the tempering effect of the heater, will produce uncomfortable drafts. The limiting thermostat functions to prevent this condition. In certain cases, however, the room may receive heat from exposed pipes or from solar radiation, and its temperature may rise substantially above the temperature setting of the room thermostat, in which case the action of the limiting thermostat aggravates the overheating.

The present invention provides means which will render the limiting thermostat inactive when room temperature rises a certain amount, and ordinarily an abnormal amount, above the setting of the room thermostat.

While the invention is not limited in its utility to duct heatng systems, such systems offer the largest field of commercial use, and the invention will be described as applied to a heating system of this general type, namely, one making use of a so-called unit heater.

In the drawing,—

Fig. 1 is a diagrammatic elevation of a heating system making use of a direct radiator and a unit heater having two heating radiators. The unit heater is shown in end elevation.

Fig. 2 is a vertical axial section of a limiting thermostat modified according to the present invention.

Fig. 3 is a front elevation thereof, with the cover removed.

Fig. 4 is a diagram of the piping connections of the limiting thermostat and one of the heat controlling valves associated with a unit heater.

Referring first to Fig. 1, a thermostat 6 is indicated as supported on the wall of the room to be heated. This thermostat may conveniently be of the type described and claimed in the patent to Otto, 1,500,260, July 8, 1924. A thermostat of this type receives compressed air from a supply line 7 and functions in response to changes in room temperature to establish a varying pressure in the branch line 8.

It will be understood that the pressure in the line 8 rises and falls as temperature rises and falls, and merely for purposes of explanation, it will be assumed hereinafter that the pressure in the line varies from atmospheric pressure when room temperature is at a chosen low value, assumed to be 70°, to 11 pounds gage, when room temperature is at its normal high value, say 72°.

The branch line 8 may be connected to one or more motors actuating heat controlling means. In the drawing there is a motor 9, which functions to close a steam valve 11 against the resistance of a return spring. The motor 9 is of the familiar metallic bellows type and requires no detailed explanation. The valve 11 is opened by the spring when the pressure in the line is low, and is closed progressively as the pressure in the line rises. The strength of the spring is chosen in this instance so that the valve 11 will be completely closed when pressure in the line 8 is 4 pounds gage.

The valve 11 controls the supply of heating medium (steam) to a direct radiator 12 mounted in the room.

In the same room with the radiator 12 is a unit heater, indicated generally by the numeral 13, applied to its case. Generally stated, a unit heater is a cabinet having means arranged to draw air partly from out of doors and partly from the room, or all from out of doors, pass the air over a heating unit or units in the cabinet, and deliver the air so heated to the room. The unit heater may include dampers for controlling or proportioning the fresh and recirculated air, or such dampers may be omitted. The presence or absence of the dampers is immaterial to the present invention.

For purposes of illustration I have chosen a unit heater of a well known type, having two superposed heating units, 14 and 15, indicated in dotted lines on Fig. 1. Fresh air enters the cabinet through a duct at the back thereof, indicated at 16, and the recirculated air enters the cabinet through a grill in the lower part of the front of the cabinet. The position of the grill is indicated by the arrow 17. The heated air is discharged to the room through a grill in the top of the cabinet, indicated at 18.

The upper heating unit 14 is a radiator, and the supply of steam thereto is controlled by a bellows motor operated valve, indicated generally by the numeral 19. The lower heating unit 15 is also a steam radiator, and is controlled by a bellows motor actuated valve, indicated generally at 21. The motor valves 19 and 21 are similar in construction to the motor 9 with its valve 11. The valve 21 is shown in section in Fig. 4.

The only difference between the motors 9, 19 and 21 is in the strength of the return springs, the spring in motor 19 being such that the valve will be completely closed when line pressure is 8 pounds gage, while the valve 21 will close when line pressure is 11 pounds gage. This insures that on rising temperature first the radiator then the upper heating unit 14 and then the lower heating unit 15 will be shut down successively.

The motor 19 is connected directly to the branch line 8. The motor 21 is also connected to the branch line 8, but is indirectly connected thereto through the limiting thermostat which will now be described.

The base 22 of the thermostat is mounted against the end wall of the cabinet 13 of the unit heater, so that the tubular extension 23 projects through the wall. This extension carries an annular guide member 24 fixed thereto. Rigidly supported on the guide member 24 is a brass or other expansible tube 25, which is the thermally responsive element of the thermostat. Engaged in the rear end of the tube 25 is a thrust rod 27, which forms the relatively inexpansible element of the thermostat. This is guided in the guide piece 24 and extends forwardly through a guideway in the base 22, terminating in a closed chamber 28.

The thrust rod 27 carries a collar 29 which serves as a spring seat for the coil compression spring 31 which urges the rod 27 to the rear into thrust engagement with the end piece 26. Leakage from the chamber 28 around the rod 27 is precluded by the use of metallic bellows 32 connected at its forward end with the base 22 and at its rear end with the collar 29. The branch pipe 8 is connected to the connection 33 while the motor 21 is connected to the connection 34.

Pressure fluid arriving at the connection 33 by way of branch pipe 8, flows through the passage 35 past a restricting valve of the needle type, 36, through a port 37 to the leak port 38. There is a branch 39 leading to the connection 34 and thence by way of the branch extension 41 to the motor 21.

The leak port 38 is of the usual form and is opened and closed by a swinging valve element 42 which is pivoted at 43 and may be urged in an opening direction by the rod 27 when the tube 25 shrinks in length as the result of a temperature reduction. The valve member 42 is urged in a closing direction by any suitable means, here shown as a spring 40.

In order to adjust the temperature of response, an adjustable thrust screw 44 serves as a thrust connection between the valve member 42 and the thrust rod 27. The screw 45 is merely a plug to prevent leakage to atmosphere past the threads of the needle valve 36.

If the chamber 28 were open to atmosphere, and in such case the metallic bellows 32 would be omitted, the structure so far described conforms to past practice.

In order to render the limiting thermostat inoperative at certain times, a second valve is connected in series with the leak valve 38—42 and is arranged to be operated by the thermostat 6. To accomplish this result the chamber 28 is closed at its forward side by a member 46 upon which is mounted a leak port 47 controlling a passage 48 leading from the chamber 28 to atmosphere. A projection 49 carries a nipple 51 on which is threaded the lower end of an expansible bellows motor 52, whose upper end comprises a plate 53 which will move up into sealing relation with the lower end of the leak port 47 when the bellows 52 are distended. The normal lower position of the bellows motor is defined by the stem 54, and the upper end is guided by a cup-like member 55 which is slidable on the stem of the leak port 47. Sufficient clearance is present to permit free escape of air.

The upper end of the bellows motor is urged downward by coil compression spring 56. The strength is such that the port 47 will not be sealed by the disk 53 until the bellows 52 are subject to an internal pressure of 13 pounds gage, i. e., a pressure somewhat above the pressure necessary to close the motor valve 21. Pressure is admitted to the interior of the bellows 52 by a passage 57 which leads through the body 46 and the base 22 to the connection 33 and consequently to the branch line 8. A cover 58 is mounted on the body 46 and is vented to atmosphere, as indicated at 59.

Operation

Assuming that steam or other suitable heating medium is supplied to the system, and that the fan in the unit heater (if a fan is used) is running, and that compressed air, under suitable pressure, say 15 pounds, is supplied through the main 7, the operation can be traced as follows.

As the temperature in the room rises, the thermostat will establish an increasing pressure in the branch line 8. The first effect will be progressive closing of valve 11 to shut down the radiator 12. Continued rise of temperature in the room, with its attendant rise of pressure in the branch line 8, will next result in the closure of the valve 19, the pressure being then 8 pounds gage. Under these conditions the heater 15 alone will be in operation, and it will furnish sufficient heat under ordinary conditions to cause the tube 25 to expand sufficiently to close valve 42 against leak port 38. The needle valve 36 is adjusted to a capacity less than the maximum venting capacity of leak port 38. Consequently, while the port 38 is closed, the motor 21 will be actuated directly by the thermostat 6.

Under ordinary conditions, therefore, valve 21 will be closed when the thermostat establishes a branch line pressure of 11 pounds gage. As the valve 21 approaches its closed position, or when it closes, (much depends on what the outdoor temperature is) a condition will be reached at which the air passing in contact with tube 25 will be below the temperature at which valve 42 commences to open leak port 38. The partial opening of the leak port exerts a modifying effect on the pressure in the valve motor 21, and this venting will serve to cause the valve motor 21 to admit sufficient heating medium to the lower unit 15 to hold the circulating air at a desired minimum temperature. Consequently at or about the limit of operation of the thermostat 6, the limiting thermostat commences to exert a secondary control and prevents the air from discharging from the unit heater below a temperature determined by the adjustment of the screw 44.

If room temperature continues to rise, the pressure in the branch line 8 will continue to rise. Conditions are now outside the range of control of the thermostat 6, while the limiting thermostat is functioning to make sure that at least some heat is added to the entering air. If the pressure in the line 8 reaches a value determined by the strength of spring 56, and here assumed to be 13 pounds gage, the bellows motor 52 will expand sufficiently to close leak port 47 which is connected in series with the leak port 38. Stated differently, the leak port 47 is interposed between the leak port 38 and the atmosphere. The closing of the leak port 47 consequently renders the leak port 38 inoperative to vent the motor 21, and this motor closes its valve and terminates the supply of heat to the heating unit 15. Consequently in this device at or near the limit of regulatory action of the room thermostat 6, the limiting thermostat takes control and retains control until room temperature passes substantially beyond the range of control of the room thermostat 6. When this second limit is reached, the limiting thermostat is rendered inactive or inoperative, or to state it somewhat differently, control is restored to the room thermostat.

The description of the invention as applied to a unit heater is illustrative and not limiting.

The invention has been described as embodied in thermostats of the well known pneumatic type, but its fundamental principle is capable of embodiment in other types of thermostats, notably, electrical thermostats and fluid pressure thermostats.

The invention in its broadest aspects is applicable to space heating generally, and is not limited to ventilating and duct heaters. Consequently, except as expressly stated in the claims, no limitation to the features of construction illustrated, is implied.

What is claimed is,—

1. The combination of a regulatable heat source; two automatic controls therefor, one automatic control responsive to temperature in a space heated by said source and having a normal range of operation in which it controls said heat source through the entire range of regulation thereof and an abnormal range beyond one limit of said normal range, and the second automatic control responsive to the rate of supply of heat to such space and serving to impose a limit thereon, the second control becoming active in the abnormal range of the first control, and means for suspending the action of the second automatic control, operated by response of the first automatic control near the extreme limit of its abnormal range.

2. The combination of a regulatable heat source; two automatic controls therefor, one automatic control responsive to temperature in a space heated by said source and having a normal range of control in which it controls said heat source through the entire range of regulation thereof and a higher range corresponding to abnormally high temperatures in the heated space, and the second automatic control responsive to the rate of supply of heat to such space and serving to establish a minimum rate of supply when said first automatic control is in said abnormal range; and means for suspending the action of the second automatic control, operated by response of the first automatic control near the upper limit of its abnormal response.

3. The combination of controllable heating means for a room; a room thermostat connected to control said heating means and functioning to hold room temperature between definite limits; a limiting thermostat subject to temperature adjacent said heating means also connected to control said heating means and functioning to prevent such adjacent temperature from passing a chosen limit; and means rendered active by said room thermostat when room temperature has passed one of said definite limits to render said limiting thermostat inactive.

4. The combination of controllable heating means for a room; a room thermostat connected to control said heating means and functioning to hold room temperature between upper and lower limits; a limiting thermostat subject to temperature adjacent said heating means also connected to control said heating means and functioning to prevent such adjacent temperature from falling below a definite value; and means rendered active by said room thermostat when room temperature rises above said upper limit to render said limiting thermostat inactive.

5. The combination of a room; a heating system therefor comprising a duct conveying air to the room, at least a part of such air being drawn from out of doors, and a controllable heater associated with said duct; a thermostat in said room connected to exert a primary control on said heater to maintain room temperature between a high and a low limit; a limiting thermostat responsive to the temperature of air flowing through the duct and connected to exert a secondary control on said heater to establish a low limit for the temperature of air discharged into the room; and means rendered active by said room thermostat, when room temperature exceeds said high limit, to render said limiting thermostat inactive.

6. The combination of a thermostat of a type adapted to establish a pressure which varies progressively in response to variation of the temperature affecting the thermostat; a heat controlling pressure motor; a restricted pressure transmitting connection between said thermostat and said motor; a limiting thermostat connected to control venting of said motor; and pressure actuated means responsive to the pressure established by the first-named thermostat and arranged to render said limiting thermostat inactive when such pressure attains a chosen value.

7. The combination of a thermostat of a type adapted to establish a pressure which varies progressively in response to variations of the temperature affecting the thermostat; a heat controlling pressure motor responsive through its entire range to pressure varying through less than the range of pressures established by the thermostat; a restricted pressure transmitting connection between said thermostat and motor; a limiting thermostat connected to control venting of said motor; pressure actuated means subject to the pressure established by the first named thermostat and connected to render the second thermostat inactive; and means for causing said pressure motor and said pressure actuated means to respond in different ranges of pressure variation.

8. The combination of a thermostat of a type adapted to establish a pressure which varies progressively in response to variations of temperature affecting the thermostat; a heat controlling pressure motor comprising a movable abutment and a return spring of such strength as to be overpowered by the abutment under a pressure less than the maximum developed by the thermostat; a restricted pressure transmitting connection between said thermostat and motor; a limiting thermostat connected to control venting of said motor; and a second pressure motor connected to suspend the action of said limiting thermostat and comprising an abutment subject to the pressure developed by the first named thermostat, and a return spring capable of resisting pressures sufficient to overpower the heat controlling pressure motor but incapable of resisting the maximum pressure developed by the thermostat first named.

9. The combination defined in claim 8 in which the second pressure motor controls a valve connected in series with the limited thermostat and controlling venting flow therethrough.

10. The combination of a control line; a pneumatic room thermostat serving to establish in said line a pressure which varies between an upper limit and a lower limit in accordance with temperature; a yieldingly loaded pressure motor having a restricted connection with said line, the loading being such that the motor will be moved through its entire range by pressures varying between said lower limit and a value intermediate said limits; heating means controlled by said pressure motor; a limiting thermostat subject to temperature adjacent said heating means, and capable of variably venting said motor to exert a secondary control on said heater; and a second yieldingly loaded motor connected with said line and connected to suspend the action of said limiting thermostat, the loading being such that the second motor will respond at pressures lower than said upper limit and not lower than said intermediate value.

11. The combination defined in claim 10, in which the second yieldingly loaded motor controls a valve connected in series with said limiting thermostat and controlling venting flow therethrough.

12. The combination of a regulatable heat source; two automatic controls therefor, one automatic control responsive to temperature in a space heated by said source and having a normal range in which it controls the heat source through the entire range of regulation thereof and an abnormal range beyond one limit of said normal range, and the second automatic control responsive to the rate of supply of heat to such space, and serving to impose a limit thereon, said second control becoming effective in the abnormal range of the first control; and means operated by response of the first automatic control near the extreme limit of the abnormal range thereof for changing the limiting action of the second automatic control.

13. The combination of a thermostat of a type adapted to establish a pressure which varies progressively in response to variation of the temperature affecting the thermostat; a heat controlling pressure motor; a restricted pressure transmitting connection between said thermostat and said motor; a limiting thermostat connected to control venting of said motor; and pressure actuated means responsive to the pressure established by the first-named thermostat and effective when such pressure becomes abnormal to change the limiting action of said limiting thermostat.

CARL A. OTTO.